(12) United States Patent
Baek et al.

(10) Patent No.: US 11,539,401 B2
(45) Date of Patent: Dec. 27, 2022

(54) COMBO ANTENNA MODULE

(71) Applicant: AMOTECH CO., LTD., Incheon (KR)

(72) Inventors: Hyungil Baek, Yongin-si (KR); Jinwon Noh, Gwangju (KR); Kisang Lim, Incheon (KR); Seonghyun Kim, Gwacheon-si (KR); Chungha Back, Yeongcheon-si (KR); Donghyun Im, Bucheon-si (KR)

(73) Assignee: AMOTECH CO., LTD., Incheon (KR)

( * ) Notice: Subject to any disclaimer, the term of this patent is extended or adjusted under 35 U.S.C. 154(b) by 0 days.

(21) Appl. No.: 17/272,064

(22) PCT Filed: Aug. 30, 2019

(86) PCT No.: PCT/KR2019/011216
§ 371 (c)(1),
(2) Date: Feb. 26, 2021

(87) PCT Pub. No.: WO2020/046074
PCT Pub. Date: Mar. 5, 2020

(65) Prior Publication Data
US 2021/0328628 A1    Oct. 21, 2021

(30) Foreign Application Priority Data

Aug. 31, 2018  (KR) .................. 10-2018-0103889

(51) Int. Cl.
*H04B 5/00*  (2006.01)
*H02J 50/10*  (2016.01)
*H01Q 1/24*  (2006.01)
*H01Q 7/00*  (2006.01)

(52) U.S. Cl.
CPC ........... *H04B 5/0037* (2013.01); *H01Q 1/242* (2013.01); *H01Q 7/00* (2013.01); *H02J 50/10* (2016.02)

(58) Field of Classification Search
CPC .............. H02J 50/00; H04B 5/00; H01Q 1/00
See application file for complete search history.

(56) References Cited

U.S. PATENT DOCUMENTS 9,553,476 B2 *   1/2017   An ........................ H02J 50/12
9,607,757 B2 *   3/2017   Hirobe ................... H02J 50/80
(Continued)

FOREIGN PATENT DOCUMENTS

KR   10-2014-0057973 A    5/2014
KR      10-1640023 B1     7/2016
(Continued)

OTHER PUBLICATIONS

International Search Report dated Jan. 31, 2020 as received in Application No. PCT/KR2019/011216.
(Continued)

*Primary Examiner* — Rexford N Barnie
*Assistant Examiner* — Joseph N Inge
(74) *Attorney, Agent, or Firm* — Maschoff Brennan

(57) ABSTRACT

Presented is a combo antenna module for preventing shadowing of a short-range communication antenna by forming a loop pattern, for short-range communication, in an inner circumferential region of a wireless power transmission antenna. The presented combo antenna module comprises a radiation pattern for wireless power transmission and a radiation pattern for short-range communication, which are disposed on a base substrate, wherein the transverse paths for entry and exit are made different for the radiation pattern for short-range communication so as to form a loop pattern in the inner area of the radiation pattern for wireless power transmission.

11 Claims, 7 Drawing Sheets

(56) References Cited

U.S. PATENT DOCUMENTS

| | | | |
|---|---|---|---|
| 9,634,392 B2* | 4/2017 | Saito | H04B 5/0087 |
| 10,680,322 B2* | 6/2020 | Lee | G06Q 20/325 |
| 2015/0061400 A1* | 3/2015 | Park | H04B 5/0037 |
| | | | 336/200 |
| 2017/0005519 A1* | 1/2017 | Lee | H02J 50/80 |
| 2017/0054213 A1* | 2/2017 | Singh | H04B 5/0081 |
| 2017/0229910 A1* | 8/2017 | Koyanagi | H04M 1/0262 |
| 2018/0159598 A1* | 6/2018 | Ahn | H01F 5/003 |
| 2019/0074577 A1* | 3/2019 | Kim | H04B 5/0025 |
| 2019/0214180 A1* | 7/2019 | Yoon | H02J 50/10 |
| 2019/0305579 A1* | 10/2019 | Yeom | H02J 50/12 |
| 2020/0168979 A1* | 5/2020 | Lee | H04B 5/0031 |
| 2021/0226312 A1* | 7/2021 | Guo | H04B 5/0037 |

FOREIGN PATENT DOCUMENTS

| | | |
|---|---|---|
| KR | 10-2018-0010010 A | 1/2018 |
| KR | 10-2018-0047823 A | 5/2018 |
| KR | 10-2018-0062929 A | 6/2018 |
| WO | 2017/078481 A1 | 5/2017 |

OTHER PUBLICATIONS

KR Office Action dated Mar. 23, 2020 as received in Application No. 10-2019-0106694.

KR Decision to Grant dated Sep. 15, 2020 as received in Application No. 10-2019-0106694.

IN Office Action in Application No. 202117008474 dated May 5, 2021.

\* cited by examiner

[FIG. 1]
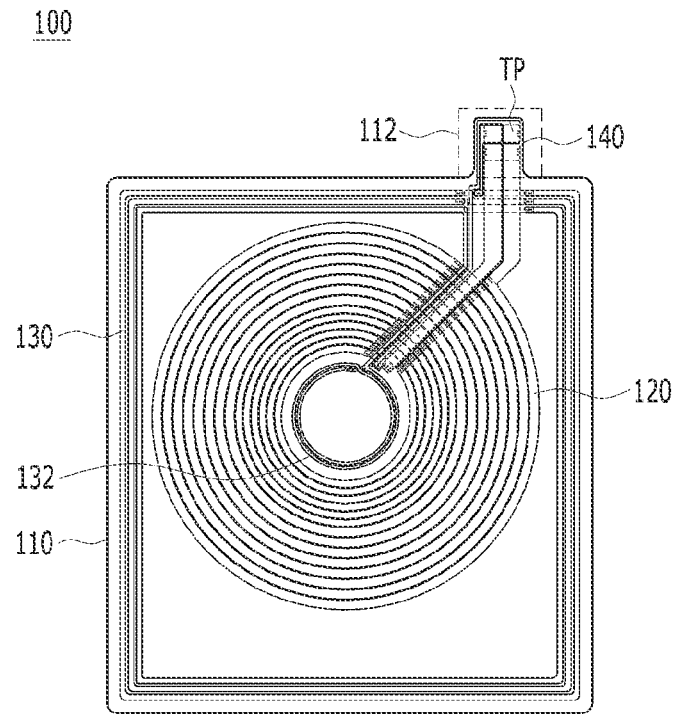
[FIG. 2]
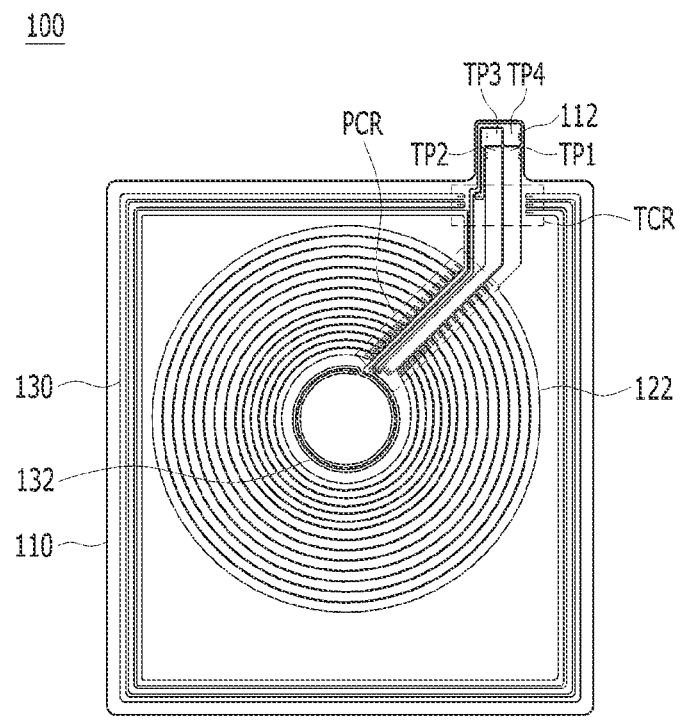

[FIG. 3]
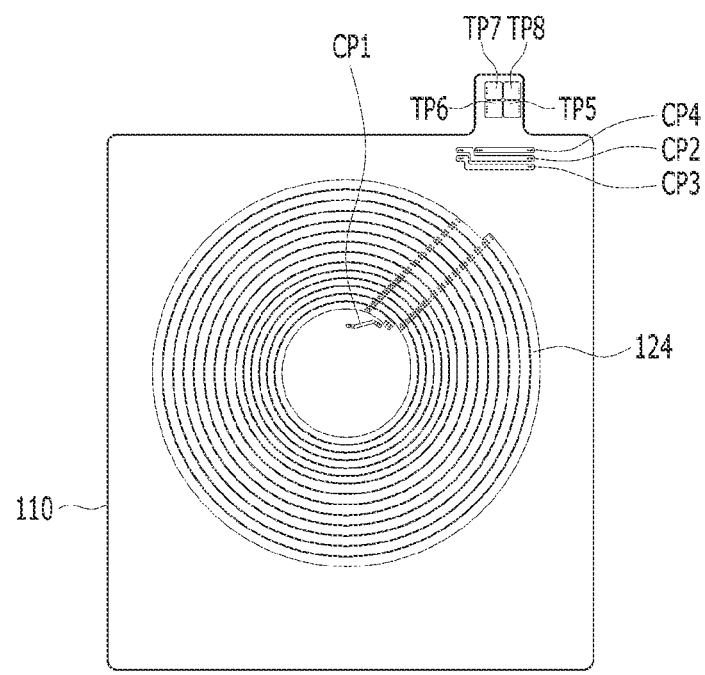
[FIG. 4]
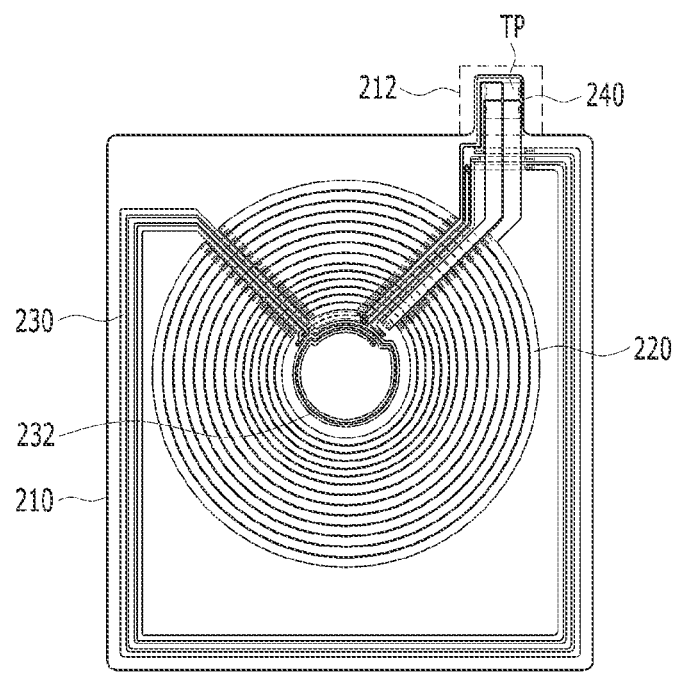

[FIG. 5]
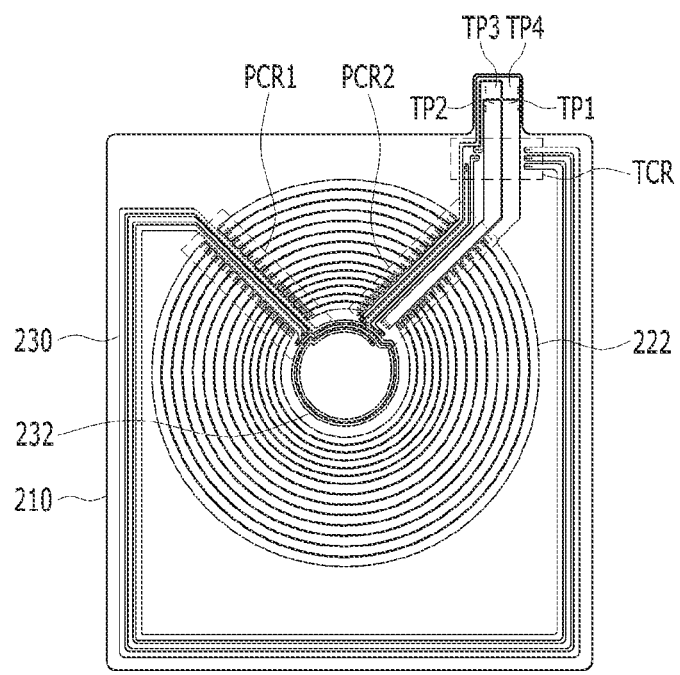
[FIG. 6]
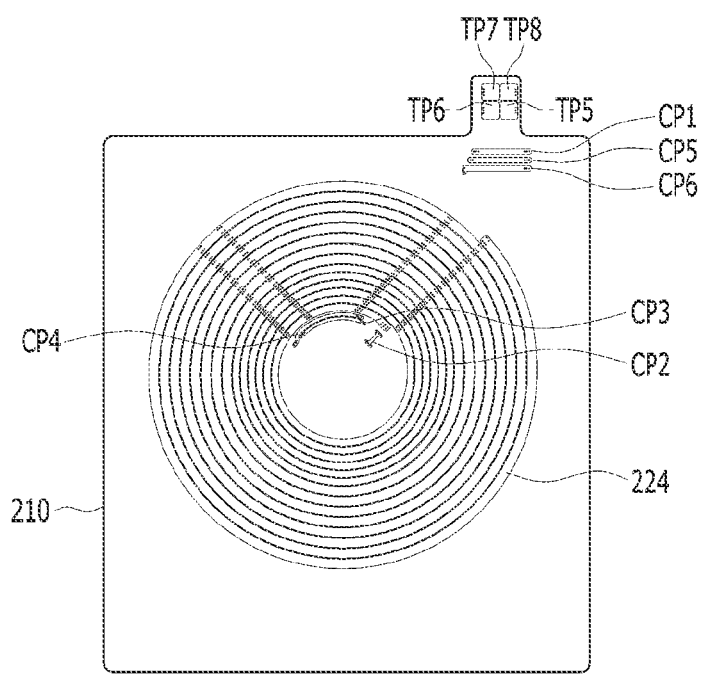

[FIG. 7]
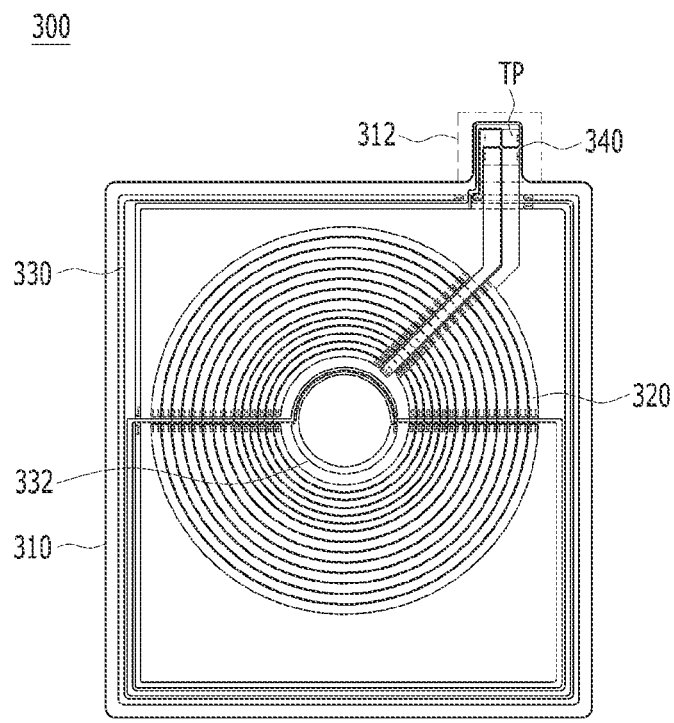
[FIG. 8]
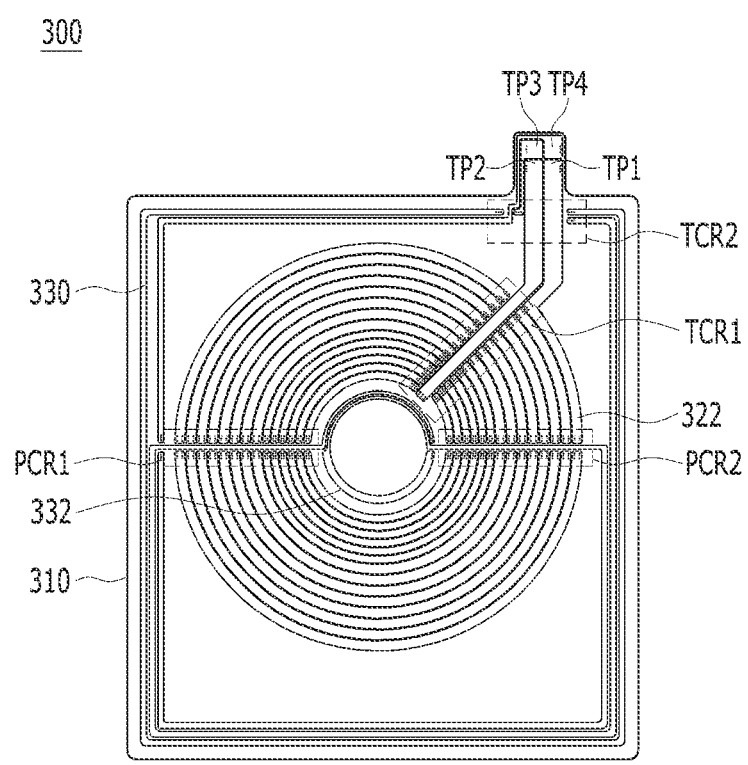

[FIG. 9]
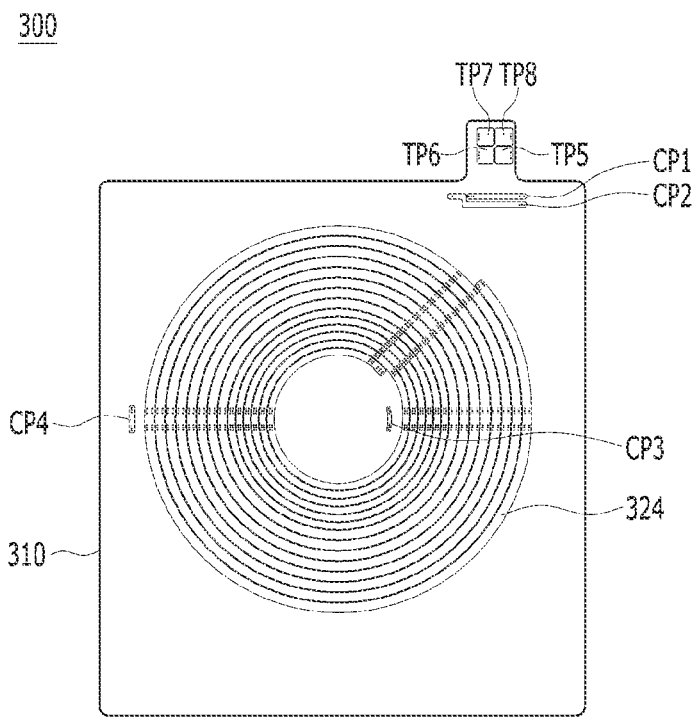
[FIG. 10]
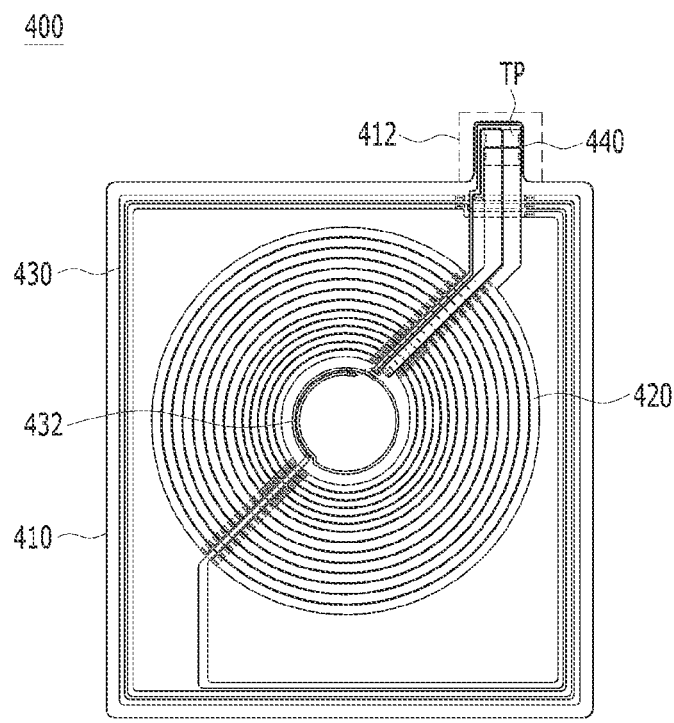

[FIG. 11]
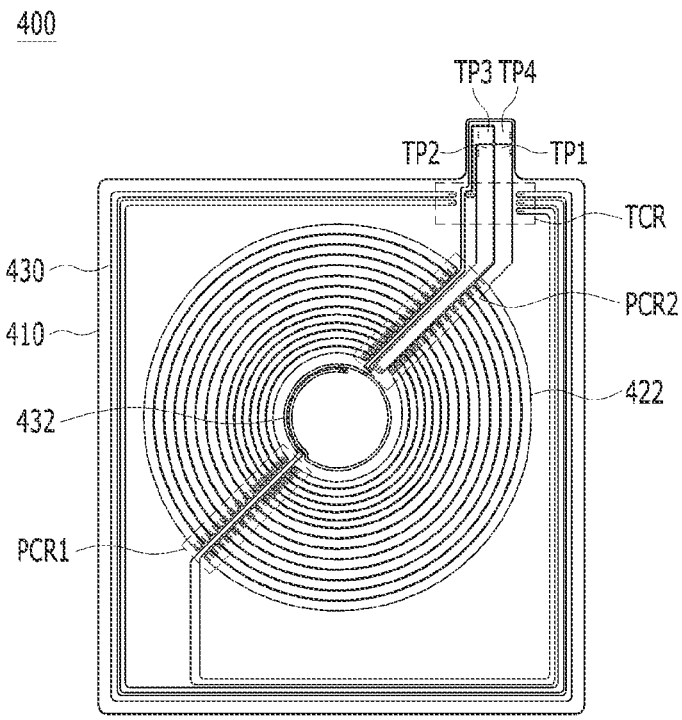
[FIG. 12]
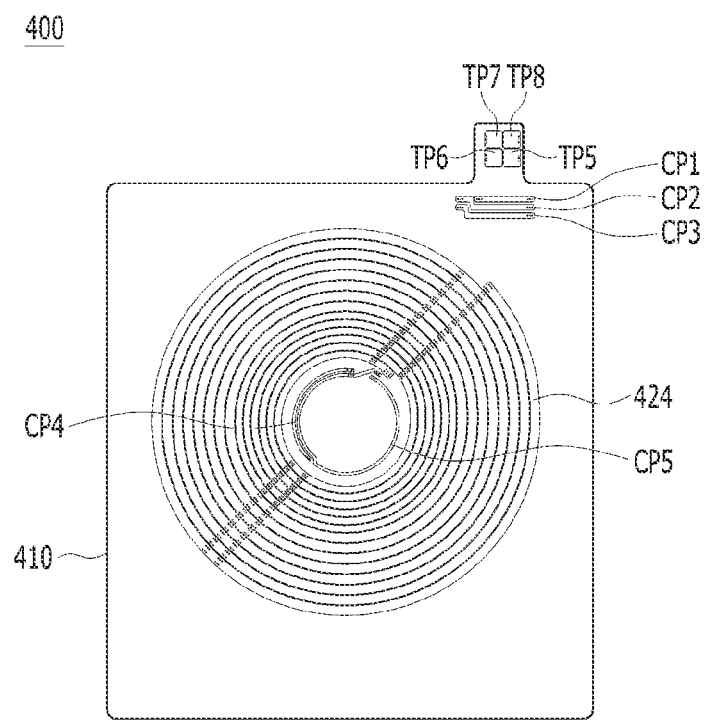

[FIG. 13]

| CLASSIFICATION | READER MODE (MM) |
|---|---|
| COMBO ANTENNA MODULE OF FIRST EMBODIMENT OF PRESENT DISCLOSURE (ONE CROSSING ROUTE) | 14 |
| COMBO ANTENNA MODULE OF SECOND EMBODIMENT OF PRESENT DISCLOSURE (V CROSSING ROUTE) | 18 |
| COMBO ANTENNA MODULE OF THIRD EMBODIMENT OF PRESENT DISCLOSURE (STRAIGHT LINE CROSSING ROUTE) | 19 |
| COMBO ANTENNA MODULE OF FOURTH EMBODIMENT OF PRESENT DISCLOSURE (OBLIQUE LINE CROSSING ROUTE) | 19 |

COMBO ANTENNA MODULE

TECHNICAL FIELD

The present disclosure relates to a combo antenna module, and more particularly, to a combo antenna module mounted on a mobile terminal and performing wireless power transmission and near field communication.

BACKGROUND ART

With the development of a technology, mobile terminals, such as a mobile phone, a PDA, a PMP, a navigation device, and a laptop, additionally provide functions, such as DMB, wireless Internet, and near field communication between devices, in addition to basic functions such as a call, video/music playback, and road guidance. Accordingly, the mobile terminal is equipped with a plurality of antennas for wireless communication such as wireless Internet and Bluetooth.

Recently, functions, such as an information exchange and charging using wireless power transmission through near field communication, are applied to a mobile terminal.

To this end, a near field communication (near field communication (NFC)) antenna used for a near field communication method and a wireless power transmission (Wireless Power Consortium (WPC)) antenna used for wireless power transmission are additionally mounted on the mobile terminal.

The near field communication antenna and the wireless power transmission antenna consist of combo antenna modules sharing one printed circuit board. In this case, the near field communication antenna is disposed outside the wireless power transmission antenna. Accordingly, there is a problem in that a shadow occurs in an inner circumferential area of the near field communication antenna because the size of a loop is increased.

DISCLOSURE

Technical Problem

The present disclosure is proposed to solve the above conventional problems, and an object of the present disclosure is to provide a combo antenna module which prevents a shadow from occurring in a near field communication antenna by forming a loop pattern for near field communication in an inner circumferential area of a wireless power transmission antenna.

Technical Solution

In order to achieve the object, a combo antenna module according to an embodiment of the present disclosure includes a base substrate, a radiation pattern for wireless power transmission disposed on the base substrate, and a radiation pattern for near field communication which is disposed on the base substrate, traverses the radiation pattern for wireless power transmission, and forms an internal loop pattern in an inner area of a loop formed by the radiation pattern for wireless power transmission, wherein a crossing route through which the radiation pattern for near field communication enters the radiation pattern for wireless power transmission and a crossing route through which the radiation pattern for near field communication exits from the radiation pattern for wireless power transmission are different.

The radiation pattern for wireless power transmission is disposed on a upper surface of the base substrate, and includes a first radiation pattern for wireless power transmission in which a first pattern crossing route and a second pattern crossing route traversed by the radiation pattern for near field communication are formed. In this case, the first pattern crossing route is spaced apart from the second pattern crossing route. The first pattern crossing route and the second pattern crossing route are not parallel to each other or the first pattern crossing route and the second pattern crossing route are disposed on the same line.

The first radiation pattern for wireless power transmission includes a first radiation pattern formed on the upper surface of the base substrate and a second radiation pattern disposed to be spaced apart from the first radiation pattern on the upper surface of the base substrate. The first pattern crossing route and the second pattern crossing route may be spaces between the first radiation pattern and the second radiation pattern.

A first end portion of the second radiation pattern may be spaced apart from a first end portion of the first radiation pattern, and may be disposed to face the first end portion of the first radiation pattern to form the first pattern crossing route.

A second end portion of the second radiation pattern may be spaced apart from a second end portion of the first radiation pattern, and may be disposed to face the second end portion of the first radiation pattern to form the second pattern crossing route.

The first radiation pattern may include a plurality of first radiation lines disposed to be spaced apart from each other. The second radiation pattern may include a plurality of second radiation lines disposed to be spaced apart from each other.

A first end portion of the plurality of first radiation lines and a first end portion of the plurality of second radiation lines may be spaced apart and disposed to face each other to form the first pattern crossing route. A second end portion of the plurality of first radiation lines and a second end portion of the plurality of second radiation lines may be spaced apart and disposed to face each other to form the second pattern crossing route.

The radiation pattern for wireless power transmission may further include a second radiation pattern for wireless power transmission disposed on a lower surface of the base substrate and electrically connected to the first radiation pattern for wireless power transmission. In this case, the first radiation pattern for wireless power transmission and the second radiation pattern for wireless power transmission may be electrically connected through a via hole penetrating the base substrate.

The radiation pattern for near field communication may include an external radiation pattern disposed on the outside of the radiation pattern for wireless power transmission and an internal loop pattern disposed within the radiation pattern for wireless power transmission and connected to the external radiation pattern. In this case, the external radiation pattern may enter the radiation pattern for wireless power transmission through a first pattern crossing route of the radiation pattern for wireless power transmission and may be electrically connected to the internal loop pattern. The internal loop pattern may exit to the outside of the radiation pattern for wireless power transmission through a second pattern crossing route of the radiation pattern for wireless power transmission which is spaced apart from the first pattern crossing route.

Advantageous Effects

According to the present disclosure, the combo antenna module has an effect in that it can prevent a shadow from occurring in an inner circumferential area of the antenna for near field communication although the size of the loop of the antenna for near field communication is increased by forming the loop pattern for near field communication in an inner circumferential area of the antenna for wireless power transmission.

Furthermore, the combo antenna module has an effect in that recognition performance of the internal loop pattern is improved because an entry route and an exit route are made different when the internal loop is formed on the inner area of the antenna for wireless power transmission.

Furthermore, the combo antenna module has an effect in that it can maintain recognition performance of the radiation pattern for near field communication to a reference or more although the inner area of the loop of the antenna for wireless power transmission is narrowed because an entry route and an exit route are made different when an internal loop is formed on the inner area of the antenna for wireless power transmission.

DESCRIPTION OF DRAWINGS

FIGS. 1 to 3 are diagrams for describing a combo antenna module according to a first embodiment of the present disclosure.

FIGS. 4 to 6 are diagrams for describing a combo antenna module according to a second embodiment of the present disclosure.

FIGS. 7 to 9 are diagrams for describing a combo antenna module according to a third embodiment of the present disclosure.

FIGS. 10 to 12 are diagrams for describing a combo antenna module according to a fourth embodiment of the present disclosure.

FIG. 13 is a diagram for describing near field communication performance of the combo antenna module according to an embodiment of the present disclosure.

MODE FOR INVENTION

Hereinafter, the most preferred embodiments of the present disclosure will be described with reference to the accompanying drawings in order to specifically describe the embodiments so that those skilled in the art to which the present disclosure pertains may easily implement the technical spirit of the present disclosure. First, in adding reference numerals to the components of each drawing, it should be noted that the same components have the same reference numerals as much as possible even if they are displayed in different drawings.

Furthermore, in describing the present disclosure, when it is determined that the detailed description of the related well-known configuration or function may obscure the gist of the present disclosure, the detailed description thereof will be omitted.

Furthermore, in describing an embodiment of the present disclosure, when it is written that any structure is disposed or formed on a "upper surface" or "lower surface" of another structure, such writing should be interpreted as including not only a case where the structures come into contact with each other, but a case where a third structure is interposed between these structures.

A common combo antenna module is designed so that a radiation pattern for near field communication is disposed on the outside of a radiation pattern for wireless power transmission.

Accordingly, if the size of the antenna for near field communication is increased, the antenna for near field communication may include a shadow area in which recognition distance performance is degraded or communication is made impossible in a tag having a small size (e.g., a size of approximately 20 mm×20 mm).

Accordingly, a combo antenna module according to an embodiment of the present disclosure prevents a shadow area from occurring in near field communication by forming an internal loop pattern, extended from a radiation pattern for near field communication, within a radiation pattern for wireless power transmission.

Referring to FIGS. 1 to 3, in the combo antenna module 100 according to a first embodiment of the present disclosure, a radiation pattern 130 for near field communication traverses a radiation pattern 120 for wireless power transmission through one pattern crossing route PCR, and forms an internal loop pattern 132 within the radiation pattern 120 for wireless power transmission.

To this end, the combo antenna module 100 according to the first embodiment of the present disclosure is configured to include a base substrate 110, the radiation pattern 120 for wireless power transmission, the radiation pattern 130 for near field communication and an terminal portion 140.

The base substrate 110 is formed of a thin film sheet-shaped material. The base substrate 110 is formed of a sheet-shaped material having a upper surface and a lower surface. The base substrate 110 is formed of a thin film flexible material, such as a film, a sheet or a thin film substrate. The base substrate 110 may be a flexible printed circuit board (FPCB). The base substrate 110 is illustrated as being a polypropylene (PP) sheet. The base substrate 110 is not limited thereto, and a material which is a thin film material and may form a metal pattern or a coil pattern constituting an antenna may be variously used.

The radiation pattern 120 for wireless power transmission is formed on the base substrate 110. The radiation pattern 120 for wireless power transmission is formed on the upper surface and lower surface of the base substrate 110. In this case, the radiation pattern 120 for wireless power transmission is configured to include a first radiation pattern 122 for wireless power transmission and a second radiation pattern 124 for wireless power transmission.

The first radiation pattern 122 for wireless power transmission is formed on the upper surface of the base substrate 110. The first radiation pattern 122 for wireless power transmission forms a first loop that turns along a winding axis plural times on the upper surface of the base substrate 110. In this case, the winding axis is a virtual axis orthogonal to the upper surface and lower surface of the base substrate 110.

A part of the loop shape of the first radiation pattern 122 for wireless power transmission is disconnected to form a pattern crossing route PCR. The first radiation pattern 122 for wireless power transmission consists of a plurality of radiation lines. The plurality of radiation lines turns along the winding axis to form the first loop, and a part of the first loop is opened to form the pattern crossing route PCR.

The pattern crossing route PCR means a route that the radiation pattern 130 for near field communication traverses in order to form the internal loop pattern 132 in the first loop of the first radiation pattern 122 for wireless power transmission. The pattern crossing route PCR is formed to extend from the winding axis to the direction of the outer circumference of the base substrate 110 and to traverse the first radiation pattern 122 for wireless power transmission. The pattern crossing route PCR is a space that belongs to the first loop formed by the first radiation pattern 122 for wireless power transmission and where the first radiation pattern 122 for wireless power transmission is not formed.

In this case, in the combo antenna module 100 according to the first embodiment of the present disclosure, only one pattern crossing route PCR is formed in the first radiation pattern 122 for wireless power transmission. Accordingly, the radiation pattern 130 for near field communication enters and exits through the one pattern crossing route PCR, and forms the internal loop pattern 132 within the first radiation pattern 122 for wireless power transmission.

The second radiation pattern 124 for wireless power transmission is formed on the lower surface of the base substrate 110. The first radiation pattern 122 for wireless power transmission is formed in the form of a loop that turns along the winding axis plural times on the lower surface of the base substrate 110.

Meanwhile, the first radiation pattern 122 for wireless power transmission and the second radiation pattern 124 for wireless power transmission wind the same winding axis, and are disposed with the base substrate 110 interposed therebetween. The first radiation pattern 122 for wireless power transmission and the second radiation pattern 124 for wireless power transmission are connected through a via hole.

In this case, the via hole penetrates the base substrate 110 in a direction from the upper surface of the base substrate 110 to the lower surface thereof, and electrically couples the first radiation pattern 122 for wireless power transmission and the second radiation pattern 124 for wireless power transmission. The via hole may be configured in plural number in order to stably couple the first radiation pattern 122 for wireless power transmission and the second radiation pattern 124 for wireless power transmission.

The radiation pattern 130 for near field communication is formed on the upper surface of the base substrate 110. The radiation pattern 130 for near field communication is disposed outside the first radiation pattern 122 for wireless power transmission. The radiation pattern 130 for near field communication forms a second loop that turns along the outer circumference of the base substrate 110 plural times on the upper surface of the base substrate 110.

The radiation pattern 130 for near field communication enters the inner area of the first loop, formed by the first radiation pattern 122 for wireless power transmission, through the pattern crossing route PCR of the first radiation pattern 122 for wireless power transmission. The radiation pattern 130 for near field communication forms the internal loop pattern 132 that turns along the winding axis plural times in the inner area of the first loop.

The radiation pattern 130 for near field communication exits from the inner area of the first loop to the outside of the first loop through the pattern crossing route PCR. The radiation pattern 130 for near field communication may exit through the pattern crossing route PCR after passing through the back surface of the base substrate 110 through a first connection pattern CP1 formed on the back surface of the base substrate 110. In this case, the radiation pattern 130 for near field communication is electrically connected to the first connection pattern CP1 through a via hole.

A first end portion of the first connection pattern CP1 is electrically connected to the radiation pattern 130 for near field communication through the via hole. A second end portion of the first connection pattern CP1 is electrically connected to a fourth terminal pattern TP4 of the terminal portion 140 through the via hole.

The radiation pattern 130 for near field communication may form a terminal crossing route TCR, traversed by a terminal pattern TP, in order to couple the radiation pattern 120 for wireless power transmission and the radiation pattern 130 for near field communication to the terminal portion 140. The radiation pattern 130 for near field communication consists of a plurality of radiation lines. The plurality of radiation lines turns along the winding axis to form the second loop. A part of the second loop is opened to form the terminal crossing route TCR.

The terminal crossing route TCR means a route through which the terminal pattern TP traverses the radiation pattern 130 for near field communication in order to be electrically connected to the radiation pattern 120 for wireless power transmission and the radiation pattern 130 for near field communication. The terminal crossing route TCR is formed so that the terminal pattern TP traverses the radiation pattern 130 for near field communication. The terminal crossing route TCR is a space where the radiation pattern 130 for near field communication is not formed, in the second loop formed by the radiation pattern 130 for near field communication.

The radiation pattern 130 for near field communication forms the second loop by detouring through a second connection pattern CP2 and a third connection pattern CP3 formed on the lower surface of the base substrate 110 in the terminal crossing route TCR. In this case, the radiation pattern 130 for near field communication is electrically connected to the second connection pattern CP2 and the third connection pattern CP3 through the via hole.

The terminal portion 140 is formed on a protruding area 112 of the base substrate 110. A plurality of the terminal patterns TP for coupling the radiation pattern 120 for wireless power transmission and the radiation pattern 130 for near field communication to an external substrate is disposed on the terminal portion 140.

The terminal portion 140 includes a first terminal pattern TP1 to the fourth terminal pattern TP4 formed in the protruding area 112 of the base substrate 110.

The first terminal pattern TP1 is formed in the protruding area 112 of the base substrate 110 and connected to first end portions of the first radiation pattern 122 for wireless power transmission and the second radiation pattern 124 for wireless power transmission. The first terminal pattern TP1 traverses the second loop, formed by the radiation pattern 130 for near field communication, through the terminal crossing route TCR, and is connected to the first end portion of the first radiation pattern 122 for wireless power transmission disposed on the outermost side of the first loop formed by the first radiation pattern 122 for wireless power transmission. In this case, the first terminal pattern TP1 is connected to the first end portion of the second radiation pattern 124 for wireless power transmission through a via hole.

The second terminal pattern TP2 is formed in the protruding area 112 of the base substrate 110 and connected to a second end portion of the first radiation pattern 122 for wireless power transmission. The second terminal pattern TP2 traverses the second loop, formed by the radiation pattern 130 for near field communication, through the terminal crossing route TCR, traverses the first loop, formed by the first radiation pattern 122 for wireless power transmission, through the pattern crossing route PCR, and is connected to the second end portion of the first radiation pattern 122 for wireless power transmission disposed on the innermost side of the first loop. In this case, the second terminal pattern TP2 is connected to the second radiation pattern 124 for wireless power transmission through a via hole.

A third terminal pattern TP3 is formed in the protruding area 112 of the base substrate 110 and connected to a first end portion of the radiation pattern 130 for near field communication. The third terminal pattern TP3 is connected, through a via hole, to the first end portion of the radiation pattern 130 for near field communication disposed on the outermost side of the second loop where the radiation pattern 130 for near field communication is formed through a fourth connection pattern CP4 formed on the lower surface of the base substrate 110.

The fourth terminal pattern TP4 is formed in the protruding area 112 of the base substrate 110 and connected to a second end portion of the radiation pattern 130 for near field communication. The fourth terminal pattern TP4 traverses the second loop, formed by the radiation pattern 130 for near field communication, through the terminal crossing route TCR, traverses the first loop, formed by the first radiation pattern 122 for wireless power transmission, through the pattern crossing route PCR, and is connected to the second end portion of the radiation pattern 130 for near field communication disposed on the outermost side of the internal loop pattern 132. In this case, the fourth terminal pattern TP4 is connected to the first connection pattern CP1, electrically connected to the second end portion of the radiation pattern 130 for near field communication, through a via hole.

The terminal portion 140 may further include a fifth terminal pattern TP5 to an eighth terminal pattern TP8 disposed on the lower surface of the base substrate 110 in the protruding area 112. The fifth terminal pattern TP5 is electrically connected to the first terminal pattern TP1 through a via hole. The sixth terminal pattern TP6 is electrically connected to the second terminal pattern TP2 through a via hole. The seventh terminal pattern TP7 is electrically connected to the third terminal pattern TP3 through a via hole. The eighth terminal pattern TP8 is electrically connected to the fourth terminal pattern TP4 through a via hole.

The combo antenna module 100 according to the first embodiment of the present disclosure can prevent a shadow area from occurring in near field communication because the radiation pattern 130 for near field communication enters and exits from the first radiation pattern 122 for wireless power transmission through the one pattern crossing route PCR and forms the internal loop pattern 132.

However, in the case of a recent wireless charging technology, the size of the inner diameter of a loop (the first loop) formed by the radiation pattern 120 for wireless power transmission is decreased for charging between a mobile terminal and a wearable terminal in addition to wireless charging between mobile terminals. Accordingly, if the combo antenna module 100 according to the first embodiment of the present disclosure is applied, recognition performance may be deteriorated (degraded) because the internal loop pattern 132 becomes too small.

Accordingly, in combo antenna modules according to second to fourth embodiments of the present disclosure, routes for entry into and exit from the inner area of a radiation pattern for wireless power transmission in order to form an internal loop pattern are made different, thereby improving recognition performance of the internal loop pattern.

Referring to FIGS. 4 to 6, in a combo antenna module 200 according to a second embodiment of the present disclosure, a radiation pattern 230 for near field communication enters a radiation pattern 220 for wireless power transmission through a first pattern crossing route PCR1 to form an internal loop, and exits to the outside of the radiation pattern 220 for wireless power transmission through a second pattern crossing route PCR2. In this case, the first pattern crossing route PCR1 and the second pattern crossing route PCR2 are disposed on a way to be not in parallel to each other, and are illustrated as being disposed in a "V" shape.

To this end, the combo antenna module 200 according to the second embodiment of the present disclosure is configured to include a base substrate 210, the radiation pattern 220 for wireless power transmission, the radiation pattern 230 for near field communication and an terminal portion 240.

The base substrate 210 is formed of a thin film sheet-shaped material. The base substrate 210 is formed of a sheet-shaped material having a upper surface and a lower surface. The base substrate 210 is formed of a thin film flexible material, such as a film, a sheet or a thin film substrate. The base substrate 210 may be a flexible printed circuit board (FPCB). The base substrate 210 is illustrated as being a polypropylene (PP) sheet. The base substrate 210 is not limited thereto, and a material which is a thin film material and may form a metal pattern or a coil pattern constituting an antenna may be variously used.

The radiation pattern 220 for wireless power transmission is formed on the base substrate 210. The radiation pattern 220 for wireless power transmission is formed on the upper surface and lower surface of the base substrate 210. In this case, the radiation pattern 220 for wireless power transmission is configured to include a first radiation pattern 222 for wireless power transmission and a second radiation pattern 224 for wireless power transmission.

The first radiation pattern 222 for wireless power transmission is formed on the upper surface of the base substrate 210. The first radiation pattern 222 for wireless power transmission forms a first loop that turns along a winding axis plural times on the upper surface of the base substrate 210. In this case, the winding axis is a virtual axis orthogonal to the upper surface and lower surface of the base substrate 210.

A part of the loop shape of the first radiation pattern 222 for wireless power transmission is disconnected to form the first pattern crossing route PCR1. The first radiation pattern 222 for wireless power transmission consists of a plurality of radiation lines. The plurality of radiation lines turns along the winding axis to form the first loop. A part of the first loop is opened to form the first pattern crossing route PCR1.

A part of the loop shape of the first radiation pattern 222 for wireless power transmission is disconnected at a location spaced apart from the first pattern crossing route PCR1, so that the second pattern crossing route PCR2 is formed. The first radiation pattern 222 for wireless power transmission consists of the plurality of radiation lines. The plurality of radiation lines turns along the winding axis to form the first loop. A part of the first loop is opened at a location spaced apart from the first pattern crossing route PCR1, so that the second pattern crossing route PCR2 is formed.

The first pattern crossing route PCR1 and the second pattern crossing route PCR2 mean routes that the radiation pattern 230 for near field communication traverses in order to form an internal loop pattern 232 in the first loop of the first radiation pattern 222 for wireless power transmission. The first pattern crossing route PCR1 and the second pattern crossing route PCR2 are formed to extend from the winding axis to the direction of the outer circumference of the base substrate 210 and to cross the first radiation pattern 222 for wireless power transmission. The first pattern crossing route PCR1 and the second pattern crossing route PCR2 are spaces where the first radiation pattern 222 for wireless power transmission is not formed, in the first loop formed by the first radiation pattern 222 for wireless power transmission.

The first pattern crossing route PCR1 and the second pattern crossing route PCR2 are formed in a way to be not in parallel to each other. That is, an internal angle between a virtual line that couples the first pattern crossing route PCR1 and the winding axis and a virtual line that couples the second pattern crossing route PCR2 and the winding axis is formed to be approximately less than 180°. Accordingly, the first pattern crossing route PCR1 and the second pattern crossing route PCR2 are formed to have a "V" shape around the winding axis.

The first radiation pattern 222 for wireless power transmission may be divided into a first pattern and a second pattern on the basis of the first pattern crossing route PCR1 and the second pattern crossing route PCR2. The first pattern is a pattern that belongs to the first radiation pattern 222 for wireless power transmission and that is disposed at a location of the internal angle between the first pattern crossing route PCR1 and the second pattern crossing route PCR2. The second pattern is a pattern that belongs to the first radiation pattern 222 for wireless power transmission and that is disposed at a location of an external angle between the first pattern crossing route PCR1 and the second pattern crossing route PCR2.

The second radiation pattern 224 for wireless power transmission is formed on the lower surface of the base substrate 210. The first radiation pattern 222 for wireless power transmission is formed in the form of a loop that turns along the winding axis plural times on the lower surface of the base substrate 210.

Meanwhile, the first radiation pattern 222 for wireless power transmission and the second radiation pattern 224 for wireless power transmission wind the same winding axis, and are disposed with the base substrate 210 interposed therebetween. The first radiation pattern 222 for wireless power transmission and the second radiation pattern 224 for wireless power transmission are connected through a via hole.

In this case, the via hole penetrates the base substrate 210 in a direction from the upper surface of the base substrate 210 to the lower surface thereof, and electrically couples the first radiation pattern 222 for wireless power transmission and the second radiation pattern 224 for wireless power transmission. The via hole may be configured in plural number in order to stably couple the first radiation pattern 222 for wireless power transmission and the second radiation pattern 224 for wireless power transmission.

The radiation pattern 230 for near field communication is formed on the upper surface of the base substrate 210. The radiation pattern 230 for near field communication rounds the outside and inner area of the first radiation pattern 222 for wireless power transmission, and forms a second loop. The radiation pattern 230 for near field communication forms the internal loop pattern 232 in the inner area of the first radiation pattern 222 for wireless power transmission.

In order to form the second loop and the internal loop pattern 232, the radiation pattern 230 for near field communication traverses the first radiation pattern 222 for wireless power transmission through the first pattern crossing route PCR1 and enters the inner area of the first loop of the first radiation pattern 222 for wireless power transmission. The radiation pattern 230 for near field communication forms the internal loop pattern 232 that turns along the winding axis plural times in the inner area of the first loop, and then exits to the outside of the first loop. In this case, the radiation pattern 230 for near field communication traverses the first radiation pattern 222 for wireless power transmission through the second pattern crossing route PCR2, and exits from the inner area of the first loop of the first radiation pattern 222 for wireless power transmission to the outside.

In this case, it has been described that the radiation pattern 230 for near field communication enters the first loop through the first pattern crossing route PCR1 and exits from the first loop through the second pattern crossing route PCR, but the present disclosure is not limited thereto. The radiation pattern 230 for near field communication may enter the first loop through the second pattern crossing route PCR2, and may exit from the first loop through the first pattern crossing route PCR1.

For example, the radiation pattern 230 for near field communication is electrically connected to a third terminal pattern TP3 of the terminal portion 240 through a first connection pattern CP1 formed on a back surface of the base substrate 210. The radiation pattern 230 for near field communication turns along the outer circumference of the base substrate 210 on the base substrate 210, and then enters the inner area of the first loop, formed by the first radiation pattern 222 for wireless power transmission, through the first pattern crossing route PCR1.

The radiation pattern 230 for near field communication turns around the winding axis in the inner area of the first loop, thus forming the internal loop pattern 232. After forming the internal loop pattern 232, the radiation pattern 230 for near field communication exits to the outer circumference of the first loop via the back surface of the base substrate 210 through a second connection pattern CP2.

Thereafter, the radiation pattern 230 for near field communication forms the second loop by repeating entry to and exit from the first loop through the first pattern crossing route PCR1 and the second pattern crossing route PCR2 and going via the back surface of the base substrate 210 through the third connection pattern CP3 and the fourth connection pattern CP4. After exiting through the second pattern crossing route PCR2, the radiation pattern 230 for near field communication is electrically connected to the fourth terminal pattern TP4.

The radiation pattern 230 for near field communication may form a terminal crossing route TCR traversed by a terminal pattern TP so as to couple the radiation pattern 220 for wireless power transmission and the radiation pattern 230 for near field communication to the terminal portion 240. The radiation pattern 230 for near field communication consists of a plurality of radiation lines. The plurality of radiation lines rounds the outside and inner area of the first radiation pattern 222 for wireless power transmission, and forms the second loop. A part of the second loop is opened to form the terminal crossing route TCR.

The terminal crossing route TCR means a route through which the terminal pattern TP traverses the radiation pattern 230 for near field communication in order to be electrically connected to the radiation pattern 220 for wireless power transmission and the radiation pattern 230 for near field communication. The terminal crossing route TCR is formed so that the terminal pattern TP traverses the radiation pattern 230 for near field communication. The terminal crossing route TCR is a space where the radiation pattern 230 for near field communication is not formed, in the second loop formed by the radiation pattern 230 for near field communication.

The radiation pattern 230 for near field communication forms the second loop by making a detour from the terminal crossing route TCR to the lower surface of the base substrate 210 through the first connection pattern CP1, a fifth connection pattern CP5, and a sixth connection pattern CP6 formed on the lower surface of the base substrate 210. In this case, the radiation pattern 230 for near field communication is electrically connected to the first connection pattern CP1, the fifth connection pattern CP5, and the sixth connection pattern CP6 through a via hole.

The terminal portion 240 is formed in a protruding area 212 of the base substrate 210. The plurality of terminal patterns TP for coupling the radiation pattern 220 for wireless power transmission and the radiation pattern 230 for near field communication to an external substrate is disposed on the terminal portion 240.

The terminal portion 240 includes a first terminal pattern TP1 to a fourth terminal pattern TP4 formed in the protruding area 212 of the base substrate 210.

The first terminal pattern TP1 is formed in the protruding area 212 of the base substrate 210, and is connected to first end portions of the first radiation pattern 222 for wireless power transmission and the second radiation pattern 224 for wireless power transmission. The first terminal pattern TP1 traverses the second loop, formed by the radiation pattern 230 for near field communication, through the terminal crossing route TCR, and is connected to the first end portion of the first radiation pattern 222 for wireless power transmission disposed on the outermost side of the first loop formed by the first radiation pattern 222 for wireless power transmission. In this case, the first terminal pattern TP1 is connected to the first end portion of the second radiation pattern 224 for wireless power transmission through a via hole.

The second terminal pattern TP2 is formed in the protruding area 212 of the base substrate 210 and connected to a second end portion of the first radiation pattern 222 for wireless power transmission. The second terminal pattern TP2 traverses the second loop, formed by the radiation pattern 230 for near field communication, through the terminal crossing route TCR, traverses the first loop, formed by the first radiation pattern 222 for wireless power transmission, through the pattern crossing route PCR, and is connected to the second end portion of the first radiation pattern 222 for wireless power transmission disposed on the innermost side of the first loop. In this case, the second terminal pattern TP2 is connected to the second radiation pattern 224 for wireless power transmission through a via hole.

The third terminal pattern TP3 is formed in the protruding area 212 of the base substrate 210 and connected to a first end portion of the radiation pattern 230 for near field communication. The third terminal pattern TP3 is connected, through a via hole, to the first end portion of the radiation pattern 230 for near field communication disposed on the outermost side of the second loop where the radiation pattern 230 for near field communication is formed through the first connection pattern CP1 formed on the lower surface of the base substrate 210.

The fourth terminal pattern TP4 is formed in the protruding area 212 of the base substrate 210 and connected to a second end portion of the radiation pattern 230 for near field communication. The fourth terminal pattern TP4 traverses the second loop, formed by the radiation pattern 230 for near field communication, through the terminal crossing route TCR, traverses the first loop, formed by the first radiation pattern 222 for wireless power transmission, through the pattern crossing route PCR, and is connected to the second end portion of the radiation pattern 230 for near field communication disposed on the innermost side of the internal loop pattern 232. In this case, the fourth terminal pattern TP4 is connected, through a via hole, to the fourth connection pattern CP4 electrically connected to the second end portion of the radiation pattern 230 for near field communication.

The terminal portion 240 may further include a fifth terminal pattern TP5 to an eighth terminal pattern TP8 disposed on the lower surface of the base substrate 210 in the protruding area 212. The fifth terminal pattern TP5 is electrically connected to the first terminal pattern TP1 through a via hole. The sixth terminal pattern TP6 is electrically connected to the second terminal pattern TP2 through a via hole. The seventh terminal pattern TP7 is electrically connected to the third terminal pattern TP3 through a via hole. The eighth terminal pattern TP8 is electrically connected to the fourth terminal pattern TP4 through a via hole.

As described above, in the combo antenna module 200 according to the second embodiment of the present disclosure, in order to form the internal loop pattern 232, the radiation pattern 230 for near field communication enters and exits from the radiation pattern 220 for wireless power transmission through the two routes (i.e., the first pattern crossing route PCR1 and the second pattern crossing route PCR2) formed in the "V" shape. Accordingly, recognition performance of the internal loop pattern 232 can be improved because the entry route and the exit route are different.

Referring to FIGS. 7 to 9, in a combo antenna module 300 according to a third embodiment of the present disclosure, a radiation pattern 330 for near field communication enters a radiation pattern 320 for wireless power transmission through a first pattern crossing route PCR1, forms an internal loop, and exits to the outside of the radiation pattern 320 for wireless power transmission through a second pattern crossing route PCR2. In this case, the first pattern crossing route PCR1 and the second pattern crossing route PCR2 are illustrated as being disposed on the same line and disposed in a straight-line ("-") shape.

To this end, the combo antenna module 300 according to the third embodiment of the present disclosure is configured to include a base substrate 310, the radiation pattern 320 for wireless power transmission, the radiation pattern 330 for near field communication, and an terminal portion 340.

The base substrate 310 is formed of a thin film sheet-shaped material. The base substrate 310 is formed of a sheet-shaped material having a upper surface and a lower surface. The base substrate 310 is formed of a thin film flexible material, such as a film, a sheet or a thin film substrate. The base substrate 310 may be a flexible printed circuit board (FPCB). The base substrate 310 is illustrated as being a polypropylene (PP) sheet. The base substrate 310 is not limited thereto, and a material which is a thin film material and may form a metal pattern or a coil pattern constituting an antenna may be variously used.

The radiation pattern 320 for wireless power transmission is formed on the base substrate 310. The radiation pattern 320 for wireless power transmission is formed on the upper surface and lower surface of the base substrate 310. In this case, the radiation pattern 320 for wireless power transmission is configured to include a first radiation pattern 322 for wireless power transmission and a second radiation pattern 324 for wireless power transmission.

The first radiation pattern 322 for wireless power transmission is formed on the upper surface of the base substrate 310. The first radiation pattern 322 for wireless power transmission forms a first loop that turns along a winding axis plural times on the upper surface of the base substrate 310. In this case, the winding axis is a virtual axis orthogonal to the upper surface and lower surface of the base substrate 310.

A part of the loop shape of the first radiation pattern 322 for wireless power transmission is disconnected to form the first pattern crossing route PCR1. The first radiation pattern 322 for wireless power transmission consists of a plurality of radiation lines. The plurality of radiation lines turns along the winding axis to form the first loop. A part of the first loop is opened to form the first pattern crossing route PCR1.

A part of the loop shape of the first radiation pattern 322 for wireless power transmission is disconnected at a location spaced apart from the first pattern crossing route PCR1, so that the second pattern crossing route PCR2 is formed. The first radiation pattern 322 for wireless power transmission consists of a plurality of radiation lines. The plurality of radiation lines turns along the winding axis to form the first loop. A part of the first loop is opened at a location spaced apart from the first pattern crossing route PCR1, so that the second pattern crossing route PCR2 is formed.

The first pattern crossing route PCR1 and the second pattern crossing route PCR2 mean routes that the radiation pattern 330 for near field communication traverses in order to form an internal loop pattern 332 in the first loop of the first radiation pattern 322 for wireless power transmission. The first pattern crossing route PCR1 and the second pattern crossing route PCR2 are formed to extend from the winding axis to the direction of the outer circumference of the base substrate 310 and to traverse the first radiation pattern 322 for wireless power transmission. The first pattern crossing route PCR1 and the second pattern crossing route PCR2 are spaces where the first radiation pattern 322 for wireless power transmission is not formed, in the first loop formed by the first radiation pattern 322 for wireless power transmission.

The first pattern crossing route PCR1 and the second pattern crossing route PCR2 are formed to be disposed on a virtual straight line that passes through the winding axis. A virtual line that couples the first pattern crossing route PCR1, the winding axis and the second pattern crossing route PCR2 forms a straight line. In this case, the virtual line that couples the first pattern crossing route PCR1, the winding axis and the second pattern crossing route PCR2 is disposed on parallel to one face of the base substrate 310 where the terminal portion 340 is formed. Accordingly, the first pattern crossing route PCR1 and the second pattern crossing route PCR2 are formed to have a straight line ("-") shape with respect to the winding axis.

A part of the loop shape of the first radiation pattern 322 for wireless power transmission is disconnected at a location spaced apart from the first pattern crossing route PCR1 and the second pattern crossing route PCR2, so that a first terminal crossing route TCR1 is formed. The first radiation pattern 322 for wireless power transmission consists of a plurality of radiation lines. The plurality of radiation lines turns along the winding axis to form the first loop. A part of the first loop is opened at a location spaced apart from the first pattern crossing route PCR1 and the second pattern crossing route PCR2, so that the first terminal crossing route TCR1 is formed.

The first radiation pattern 322 for wireless power transmission may be divided into a first pattern to a third pattern on the basis of the first pattern crossing route PCR1, the second pattern crossing route PCR2 and the first terminal crossing route TCR1. The first pattern is a pattern that belongs to the first radiation pattern 322 for wireless power transmission and that is disposed between the first pattern crossing route PCR1 and the first terminal crossing route TCR1. The second pattern is a pattern that belongs to the first radiation pattern 322 for wireless power transmission and that is disposed between the second pattern crossing route PCR2 and the first terminal crossing route TCR1. The third pattern is a pattern that belongs to the first radiation pattern 322 for wireless power transmission and that is disposed between the first pattern crossing route PCR1 and the second pattern crossing route PCR2.

The second radiation pattern 324 for wireless power transmission is formed on the lower surface of the base substrate 310. The first radiation pattern 322 for wireless power transmission is formed in the form of a loop that turns along the winding axis plural times on the lower surface of the base substrate 310.

Meanwhile, the first radiation pattern 322 for wireless power transmission and the second radiation pattern 324 for wireless power transmission wind the same winding axis, and are disposed with the base substrate 310 interposed therebetween. The first radiation pattern 322 for wireless power transmission and the second radiation pattern 324 for wireless power transmission are connected through a via hole.

In this case, the via hole penetrates the base substrate 310 in a direction from the upper surface of the base substrate 310 to the lower surface thereof, and electrically couples the first radiation pattern 322 for wireless power transmission and the second radiation pattern 324 for wireless power transmission. The via hole may be configured in plural number in order to stably couple the first radiation pattern 322 for wireless power transmission and the second radiation pattern 324 for wireless power transmission.

The radiation pattern 330 for near field communication is formed on the upper surface of the base substrate 310. The radiation pattern 330 for near field communication rounds the outside and inner area of the first radiation pattern 322 for wireless power transmission, and forms a second loop. The radiation pattern 330 for near field communication forms the internal loop pattern 332 in the inner area of the first radiation pattern 322 for wireless power transmission.

In order to form the second loop and the internal loop pattern 332, the radiation pattern 330 for near field communication traverses the first radiation pattern 322 for wireless power transmission through the first pattern crossing route PCR1 and enters the inner area of the first loop of the first radiation pattern 322 for wireless power transmission. The radiation pattern 330 for near field communication forms the internal loop pattern 332 that turns along the winding axis plural times in the inner area of the first loop, and then exits to the outside of the first loop. In this case, the radiation pattern 330 for near field communication traverses the first radiation pattern 322 for wireless power transmission through the second pattern crossing route PCR2, and exits from the inner area of the first loop of the first radiation pattern 322 for wireless power transmission to the outside.

In this case, it has been described that the radiation pattern 330 for near field communication enters the first loop through the first pattern crossing route PCR1 and exits from the first loop through the second pattern crossing route PCR, but the present disclosure is not limited thereto. The radiation pattern 330 for near field communication may enter the first loop through the second pattern crossing route PCR2, and may exit from the first loop through the first pattern crossing route PCR1.

For example, the radiation pattern 330 for near field communication is electrically connected to a third terminal pattern TP3 of the terminal portion 340 through a first connection pattern CP1 formed on the back surface of the base substrate 310. The radiation pattern 330 for near field communication turns along the outer circumference of the base substrate 310 on the base substrate 310, and forms the second loop via the lower surface of the base substrate 310 through a second connection pattern CP2. After forming the second loop, the radiation pattern 330 for near field communication enters the inner area of the first loop, formed by the first radiation pattern 322 for wireless power transmission, through the first pattern crossing route PCR1.

The radiation pattern 330 for near field communication turns around the winding axis by a predetermined number in the inner area of the first loop, and forms the internal loop pattern 332. In this case, the radiation pattern 330 for near field communication forms the internal loop pattern 332 via the lower surface of the base substrate 310 through a third connection pattern CP3. After forming the internal loop pattern 332, the radiation pattern 330 for near field communication exits to the outer circumference of the first loop through the second pattern crossing route PCR2. The radiation pattern 330 for near field communication is electrically connected to a fourth terminal pattern TP4 via the lower surface of the base substrate 310 through the fourth connection pattern CP4.

The radiation pattern 330 for near field communication may form a second terminal crossing route TCR2 traversed by a terminal pattern TP in order to couple the radiation pattern 320 for wireless power transmission and the radiation pattern 330 for near field communication to the terminal portion 340. The radiation pattern 330 for near field communication consists of a plurality of radiation lines. The plurality of radiation lines rounds the outside and inner area of the first radiation pattern 322 for wireless power transmission, and forms the second loop. A part of the second loop is opened to form the second terminal crossing route TCR2.

The second terminal crossing route TCR2 means a route through which the terminal pattern TP traverses the radiation pattern 330 for near field communication in order to be electrically connected to the radiation pattern 320 for wireless power transmission and the radiation pattern 330 for near field communication. The second terminal crossing route TCR2 is formed so that the terminal pattern TP traverses the radiation pattern 330 for near field communication. The second terminal crossing route TCR2 is a space where the radiation pattern 330 for near field communication is not formed, in the second loop formed by the radiation pattern 330 for near field communication.

The radiation pattern 330 for near field communication forms the second loop by making a detour from the second terminal crossing route TCR2 to the lower surface of the base substrate 310 through the first connection pattern CP1 and the second connection pattern CP2 formed on the lower surface of the base substrate 310. In this case, the radiation pattern 330 for near field communication is electrically connected to the first connection pattern CP1 and the second connection pattern CP2 through a via hole.

The terminal portion 340 is formed in a protruding area 312 of the base substrate 310. The plurality of terminal patterns TP for coupling the radiation pattern 320 for wireless power transmission and the radiation pattern 330 for near field communication to an external substrate is disposed on the terminal portion 340.

The terminal portion 340 includes a first terminal pattern TP1 to the fourth terminal pattern TP4 formed in the protruding area 312 of the base substrate 310.

The first terminal pattern TP1 is formed in the protruding area 312 of the base substrate 310 and connected to first end portions of the first radiation pattern 322 for wireless power transmission and the second radiation pattern 324 for wireless power transmission. The first terminal pattern TP1 traverses the second loop, formed by the radiation pattern 330 for near field communication, through the second terminal crossing route TCR2, and is connected to the first end portion of the first radiation pattern 322 for wireless power transmission disposed on the outermost side of the first loop formed by the first radiation pattern 322 for wireless power transmission. In this case, the first terminal pattern TP1 is connected to the first end portion of the second radiation pattern 324 for wireless power transmission through a via hole.

The second terminal pattern TP2 is formed in the protruding area 312 of the base substrate 310 and connected to a second end portion of the first radiation pattern 322 for wireless power transmission. The second terminal pattern TP2 traverses the second loop, formed by the radiation pattern 330 for near field communication, through the second terminal crossing route TCR2, traverses the first loop, formed by the first radiation pattern 322 for wireless power transmission, through the first terminal crossing route TCR1, and is connected to the second end portion of the first radiation pattern 322 for wireless power transmission disposed on the innermost side of the first loop. In this case, the second terminal pattern TP2 is connected to the second radiation pattern 324 for wireless power transmission through a via hole.

The third terminal pattern TP3 is formed in the protruding area 312 of the base substrate 310 and connected to a first end portion of the radiation pattern 330 for near field communication. The third terminal pattern TP3 is connected, through a via hole, to the first end portion of the radiation pattern 330 for near field communication disposed on the outermost side of the second loop where the radiation pattern 330 for near field communication is formed through the first connection pattern CP1 formed on the lower surface of the base substrate 310.

The fourth terminal pattern TP4 is formed in the protruding area 312 of the base substrate 310 and connected to a second end portion of the radiation pattern 330 for near field communication. The fourth terminal pattern TP4 traverses the second loop, formed by the radiation pattern 330 for near field communication, through the second terminal crossing route TCR2, and is connected to the second end portion of the radiation pattern 330 for near field communication.

The terminal portion 340 may further include a fifth terminal pattern TP5 to an eighth terminal pattern TP8 disposed on the lower surface of the base substrate 310 in the protruding area 312. The fifth terminal pattern TP5 is electrically connected to the first terminal pattern TP1 through a via hole. The sixth terminal pattern TP6 is electrically connected to the second terminal pattern TP2 through a via hole and. The seventh terminal pattern TP7 is electrically connected to the third terminal pattern TP3 through a via hole. The eighth terminal pattern TP8 is electrically connected to the fourth terminal pattern TP4 through a via hole.

As described above, in the combo antenna module 300 according to the third embodiment of the present disclosure, in order to form the internal loop pattern 332, the radiation pattern 330 for near field communication enters and exits from the radiation pattern 320 for wireless power transmission through the two routes (i.e., the first pattern crossing route PCR1 and the second pattern crossing route PCR2) formed in the straight line ("-") shape. Accordingly, recognition performance of the internal loop pattern 332 can be improved because the entry route and the exit route are different.

Referring to FIGS. 10 to 12, in a combo antenna module 400 according to a fourth embodiment of the present disclosure, a radiation pattern 430 for near field communication enters a radiation pattern 420 for wireless power transmission through a first pattern crossing route PCR1, forms an internal loop, and exits to the outside of the radiation pattern 420 for wireless power transmission through a second pattern crossing route PCR2. In this case, the first pattern crossing route PCR1 and the second pattern crossing route PCR2 are illustrated as being on the same line and disposed in an oblique line ("/") shape.

To this end, the combo antenna module 400 according to the fourth embodiment of the present disclosure is configured to include a base substrate 410, the radiation pattern 420 for wireless power transmission, the radiation pattern 430 for near field communication and an terminal portion 440.

The base substrate 410 is formed of a thin film sheet-shaped material. The base substrate 410 is formed of a sheet-shaped material having a upper surface and a lower surface. The base substrate 410 is formed of a thin film flexible material, such as a film, a sheet or a thin film substrate. The base substrate 410 may be a flexible printed circuit board (FPCB). The base substrate 410 is illustrated as being a polypropylene (PP) sheet. The base substrate 410 is not limited thereto, and a material which is a thin film material and may form a metal pattern or a coil pattern constituting an antenna may be variously used.

The radiation pattern 420 for wireless power transmission is formed on the base substrate 410. The radiation pattern 420 for wireless power transmission is formed on the upper surface and lower surface of the base substrate 410. In this case, the radiation pattern 420 for wireless power transmission is configured to include a first radiation pattern 422 for wireless power transmission and a second radiation pattern 424 for wireless power transmission.

The first radiation pattern 422 for wireless power transmission is formed on the upper surface of the base substrate 410. The first radiation pattern 422 for wireless power transmission forms a first loop that turns along a winding axis plural times on the upper surface of the base substrate 410. In this case, the winding axis is a virtual axis orthogonal to the upper surface and lower surface of the base substrate 410.

A part of the loop shape of the first radiation pattern 422 for wireless power transmission is disconnected to form the first pattern crossing route PCR1. The first radiation pattern 422 for wireless power transmission consists of a plurality of radiation lines. The plurality of radiation lines turns along the winding axis to form the first loop. A part of the first loop is opened to form the first pattern crossing route PCR1.

A part of the loop shape of the first radiation pattern 422 for wireless power transmission is disconnected at a location spaced apart from the first pattern crossing route PCR1, so that the second pattern crossing route PCR2 is formed. The first radiation pattern 422 for wireless power transmission consists of a plurality of radiation lines. The plurality of radiation lines turns along the winding axis to form the first loop. A part of the first loop is opened at the location spaced apart from the first pattern crossing route PCR1, so that the second pattern crossing route PCR2 is formed.

The first pattern crossing route PCR1 and the second pattern crossing route PCR2 mean routes that the radiation pattern 430 for near field communication traverses in order to form an internal loop pattern 432 in the first loop of the first radiation pattern 422 for wireless power transmission. The first pattern crossing route PCR1 and the second pattern crossing route PCR2 are formed to extend from the winding axis to the direction of the outer circumference of the base substrate 410 and to traverse the first radiation pattern 422 for wireless power transmission. The first pattern crossing route PCR1 and the second pattern crossing route PCR2 are spaces where the first radiation pattern 422 for wireless power transmission is not formed in the first loop formed by the first radiation pattern 422 for wireless power transmission.

The first pattern crossing route PCR1 and the second pattern crossing route PCR2 are formed to be disposed on a virtual straight line that passes through the winding axis. A virtual line that couples the first pattern crossing route PCR1, the winding axis and the second pattern crossing route PCR2 forms a straight line. In this case, the virtual line that couples the first pattern crossing route PCR1, the winding axis and the second pattern crossing route PCR2 is disposed to be not parallel to one face of the base substrate 410 where the terminal portion 440 is formed. Accordingly, the first pattern crossing route PCR1 and the second pattern crossing route PCR2 are formed to have an oblique line ("/") shape with respect to the winding axis.

The second radiation pattern 424 for wireless power transmission is formed on the lower surface of the base substrate 410. The first radiation pattern 422 for wireless power transmission is formed in the form of a loop that turns along the winding axis plural times on the lower surface of the base substrate 410.

Meanwhile, the first radiation pattern 422 for wireless power transmission and the second radiation pattern 424 for wireless power transmission wind the same winding axis, and are disposed with the base substrate 410 interposed therebetween. The first radiation pattern 422 for wireless power transmission and the second radiation pattern 424 for wireless power transmission are connected through a via hole.

In this case, the via hole penetrates the base substrate 410 in a direction from the upper surface of the base substrate 410 to the lower surface thereof, and electrically couples the first radiation pattern 422 for wireless power transmission and the second radiation pattern 424 for wireless power transmission. The via hole may be configured in plural number in order to stably couple the first radiation pattern 422 for wireless power transmission and the second radiation pattern 424 for wireless power transmission.

The radiation pattern 430 for near field communication is formed on the upper surface of the base substrate 410. The radiation pattern 430 for near field communication turns along the outer circumference of the base substrate 410 on the base substrate 410, and forms a second loop.

The radiation pattern 430 for near field communication rounds the outside of the first radiation pattern 422 for wireless power transmission, and forms the second loop. The radiation pattern 430 for near field communication forms the internal loop pattern 432 in the inner area of the first radiation pattern 422 for wireless power transmission.

In order to form the second loop and the internal loop pattern 432, the radiation pattern 430 for near field communication traverses the first radiation pattern 422 for wireless power transmission through the first pattern crossing route PCR1, and enters the inner area of the first loop of the first radiation pattern 422 for wireless power transmission. The radiation pattern 430 for near field communication forms the internal loop pattern 432 that turns along the winding axis plural times in the inner area of the first loop, and then exits to the outside of the first loop. In this case, the radiation pattern 430 for near field communication traverses the first radiation pattern 422 for wireless power transmission through the second pattern crossing route PCR2, and exits from the inner area of the first loop of the first radiation pattern 422 for wireless power transmission to the outside.

In this case, it has been described that the radiation pattern 430 for near field communication enters the first loop through the first pattern crossing route PCR1 and exits from the first loop through the second pattern crossing route PCR, but the present disclosure is not limited thereto. The radiation pattern 430 for near field communication may enter the first loop through the second pattern crossing route PCR2, and may exit from the first loop through the first pattern crossing route PCR1.

For example, the radiation pattern 430 for near field communication is electrically connected to a third terminal pattern TP3 of the terminal portion 440 through a first connection pattern CP1 formed on the back surface of the base substrate 410. The radiation pattern 430 for near field communication turns along the outer circumference of the base substrate 410 on the base substrate 410, and then forms the second loop via the lower surface of the base substrate 410 through a second connection pattern CP2 and a third connection pattern CP3. After forming the second loop, the radiation pattern 430 for near field communication enters the inner area of the first loop, formed by the first radiation pattern 422 for wireless power transmission, through the first pattern crossing route PCR1.

The radiation pattern 430 for near field communication turns around the winding axis by a predetermined number in the inner area of the first loop, and forms the internal loop pattern 432. In this case, the radiation pattern 430 for near field communication forms the internal loop pattern 432 via the lower surface of the base substrate 410 through a fourth connection pattern CP4 and a fifth connection pattern CP5. In this case, the fourth connection pattern CP4 and the fifth connection pattern CP5 may be connected to the internal loop pattern 432 in parallel. After forming the internal loop pattern 432, the radiation pattern 430 for near field communication exits to the outer circumference of the first loop through the second pattern crossing route PCR2, and is electrically connected to a fourth terminal pattern TP4.

The radiation pattern 430 for near field communication may form a terminal crossing route TCR that a terminal pattern TP traverses in order to couple the radiation pattern 420 for wireless power transmission and the radiation pattern 430 for near field communication to the terminal portion 440. The radiation pattern 430 for near field communication consists of a plurality of radiation lines. The plurality of radiation lines rounds the outside of the first radiation pattern 422 for wireless power transmission, and forms the second loop. A part of the second loop is opened to form the terminal crossing route TCR.

The terminal crossing route TCR means a route through which the terminal pattern TP traverses the radiation pattern 430 for near field communication in order to be electrically connected to the radiation pattern 420 for wireless power transmission and the radiation pattern 430 for near field communication. The terminal crossing route TCR is formed so that the terminal pattern TP traverses the radiation pattern 430 for near field communication. The terminal crossing route TCR is a space where the radiation pattern 430 for near field communication is not formed, in the second loop formed by the radiation pattern 430 for near field communication.

The radiation pattern 430 for near field communication forms the second loop by making a detour from the terminal crossing route TCR to the lower surface of the base substrate 410 through the first connection pattern CP1 to the third connection pattern CP3 formed on the lower surface of the base substrate 410. In this case, the radiation pattern 430 for near field communication is electrically connected to the first connection pattern CP1 to the third connection pattern CP3 through a via hole.

The terminal portion 440 is formed in a protruding area 412 of the base substrate 410. A plurality of terminal patterns TP for coupling the radiation pattern 420 for wireless power transmission and the radiation pattern 430 for near field communication to an external substrate is disposed on the terminal portion 440.

The terminal portion 440 includes a first terminal pattern TP1 to the fourth terminal pattern TP4 formed in the protruding area 412 of the base substrate 410.

The first terminal pattern TP1 is formed in the protruding area 412 of the base substrate 410, and is connected to first end portions of the first radiation pattern 422 for wireless power transmission and the second radiation pattern 424 for wireless power transmission. The first terminal pattern TP1 traverses the second loop, formed by the radiation pattern 430 for near field communication, through the terminal crossing route TCR, and is connected to the first end portion of the first radiation pattern 422 for wireless power transmission disposed on the outermost side of the first loop formed by the first radiation pattern 422 for wireless power transmission. In this case, the first terminal pattern TP1 is connected to the first end portion of the second radiation pattern 424 for wireless power transmission through a via hole.

The second terminal pattern TP2 is formed in the protruding area 412 of the base substrate 410 and connected to a second end portion of the first radiation pattern 422 for wireless power transmission. The second terminal pattern TP2 traverses the second loop, formed by the radiation pattern 430 for near field communication, through the terminal crossing route TCR, traverses the first loop, formed by the first radiation pattern 422 for wireless power transmission, through the second pattern crossing route PCR2, and is connected to the second end portion of the first radiation pattern 422 for wireless power transmission disposed on the innermost side of the first loop. In this case, the second terminal pattern TP2 is connected to the second radiation pattern 424 for wireless power transmission through a via hole.

The third terminal pattern TP3 is formed in the protruding area 412 of the base substrate 410 and connected to a first end portion of the radiation pattern 430 for near field communication. The third terminal pattern TP3 is connected, through a via hole, to the first end portion of the radiation pattern 430 for near field communication disposed on the outermost side of the second loop where the radiation pattern 430 for near field communication is formed through the first connection pattern CP1 formed on the lower surface of the base substrate 410.

The fourth terminal pattern TP4 is formed in the protruding area 412 of the base substrate 410 and connected to a second end portion of the radiation pattern 430 for near field communication. The fourth terminal pattern TP4 traverses the second loop, formed by the radiation pattern 430 for near field communication, through the terminal crossing route TCR, traverses the first loop, formed by the first radiation pattern 422 for wireless power transmission, through the second pattern crossing route PCR2, and is connected to the second end portion of the radiation pattern 430 for near field communication. In this case, the fourth terminal pattern TP4 is connected to the second end portion of the radiation pattern 430 for near field communication through the fifth connection pattern CP5 formed on the back surface of the base substrate 410.

The terminal portion 440 may further include a fifth terminal pattern TP5 to an eighth terminal pattern TP8 disposed on the lower surface of the base substrate 410 in the protruding area 412. The fifth terminal pattern TP5 is electrically connected to the first terminal pattern TP1 through a via hole. The sixth terminal pattern TP6 is electrically connected to the second terminal pattern TP2 through a via hole and. The seventh terminal pattern TP7 is electrically connected to the third terminal pattern TP3 through a via hole. The eighth terminal pattern TP8 is electrically connected to the fourth terminal pattern TP4 through a via hole.

As described above, in the combo antenna module 400 according to the fourth embodiment of the present disclosure, in order to form the internal loop pattern 432, the radiation pattern 430 for near field communication enters and exits from the radiation pattern 420 for wireless power transmission through the two routes (i.e., the first pattern crossing route PCR1 and the second pattern crossing route PCR2) formed in the oblique line ("/") shape. Accordingly, recognition performance of the internal loop pattern 432 can be improved because the entry route and the exit route are made different.

FIG. 13 is measured data of recognition distance performance in the areas where the internal loop patterns 132, 232, 332, and 432 are formed in the combo antenna modules 100, 200, 300, and 400 according to the embodiments of the present disclosure.

Referring to FIG. 13, it can be seen that recognition distance performance of the combo antenna modules 200, 300, and 400 of the second to fourth embodiments, each one having two crossing routes and entry into and exit from different routes, is increased compared to recognition distance performance of the combo antenna module 100 of the first embodiment in which the internal loop pattern 132 is formed through one crossing route.

Accordingly, the combo antenna modules 100, 200, 300, and 400 according to the embodiments of the present disclosure can prevent a shadow area from occurring upon near field communication by forming the internal loop patterns 132, 232, 332, and 432, respectively, and can improve recognition distance performance by making an entry crossing route and an exit crossing route different when forming the internal loop patterns 232, 332, and 432.

As described above, although the preferred exemplary embodiment according to the present disclosure has been described, it is understood that changes may be made in various forms, and those skilled in the art may practice various changed examples and modified examples without departing from the claims of the present disclosure.

The invention claimed is:

1. A combo antenna module comprising:
   a base substrate;
   a radiation pattern for wireless power transmission disposed on the base substrate; and
   a radiation pattern for near field communication which is disposed on the base substrate, and which traverses the radiation pattern for wireless power transmission to form an internal loop pattern in an inner area of a loop formed by the radiation pattern for wireless power transmission,
   wherein a crossing route through which the radiation pattern for near field communication enters the radiation pattern for wireless power transmission and a crossing route through which the radiation pattern for near field communication exits from the radiation pattern for wireless power transmission are different,
   wherein the radiation pattern for wireless power transmission comprises a first radiation pattern for wireless power transmission disposed on an upper surface of the base substrate, and a second radiation pattern for wireless power transmission disposed on a lower surface of the base substrate,
   wherein the first radiation pattern for wireless power transmission comprises a first radiation pattern formed on the upper surface of the base substrate, and a second radiation pattern disposed to be spaced apart from the first radiation pattern on the upper surface of the base substrate,
   wherein a first pattern crossing route and a second pattern crossing route traversed by the radiation pattern for near field communication are formed in the first radiation pattern for wireless power transmission, and the first pattern crossing route and the second pattern crossing route are spaces between the first radiation pattern and the second radiation pattern, and
   wherein the first radiation pattern for wireless power transmission is electrically connected to the second radiation pattern for wireless power transmission to detour to the lower surface of the base substrate at the first pattern crossing route and the second pattern crossing route by the second radiation pattern for wireless power transmission.

2. The combo antenna module of claim 1,
   wherein the first pattern crossing route is spaced apart from the second pattern crossing route.

3. The combo antenna module of claim 1,
   wherein the first pattern crossing route and the second pattern crossing route are disposed on an identical line.

4. The combo antenna module of claim 1,
   wherein a first end portion of the second radiation pattern is spaced apart from a first end portion of the first radiation pattern, and is disposed to face the first end portion of the first radiation pattern to form the first pattern crossing route.

5. The combo antenna module of claim 1,
   wherein a second end portion of the second radiation pattern is spaced apart from a second end portion of the first radiation pattern, and is disposed to face the second end portion of the first radiation pattern to form the second pattern crossing route.

6. The combo antenna module of claim 1,
   wherein the first radiation pattern comprises a plurality of first radiation lines disposed to be spaced apart from each other, and
   wherein the second radiation pattern comprises a plurality of second radiation lines disposed to be spaced apart from each other.

7. The combo antenna module of claim 6,
   wherein a first end portion of the plurality of first radiation lines and a first end portion of the plurality of second radiation lines are spaced apart from each other and disposed to face each other to form the first pattern crossing route, and wherein a second end portion of the plurality of first radiation lines and a second end portion of the plurality of second radiation lines are spaced apart from each other and disposed to face each other to form the second pattern crossing route.

8. The combo antenna module of claim 1, wherein the first radiation pattern for wireless power transmission and the second radiation pattern for wireless power transmission are electrically connected through a via hole penetrating the base substrate.

9. The combo antenna module of claim 1, wherein the radiation pattern for near field communication comprises:

an external radiation pattern disposed on an outside of the radiation pattern for wireless power transmission, and wherein the internal loop pattern is disposed within the radiation pattern for wireless power transmission and connected to the external radiation pattern.

10. The combo antenna module of claim 9, wherein the external radiation pattern enters the inner area of the radiation pattern for wireless power transmission through a first pattern crossing route of the radiation pattern for wireless power transmission and is electrically connected to the internal loop pattern.

11. The combo antenna module of claim 10, wherein the internal loop pattern exits to the outside of the radiation pattern for wireless power transmission through a second pattern crossing route of the radiation pattern for wireless power transmission which is spaced apart from the first pattern crossing route.

* * * * *